(12) United States Patent
Glazier

(10) Patent No.: US 8,353,604 B2
(45) Date of Patent: Jan. 15, 2013

(54) ILLUMINATED CUP HOLDER ASSEMBLY

(75) Inventor: Joshua T. Glazier, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 12/749,157

(22) Filed: Mar. 29, 2010

(65) Prior Publication Data

US 2011/0235354 A1 Sep. 29, 2011

(51) Int. Cl.
*F21V 33/00* (2006.01)
(52) U.S. Cl. .......................... 362/154; 362/101; 362/544
(58) Field of Classification Search .................... 362/84, 362/101, 154, 249.02, 240, 255, 311.01, 362/311.02, 562, 605
See application file for complete search history.

(56) References Cited

U.S. PATENT DOCUMENTS

| | | | |
|---|---|---|---|
| 2,745,947 A * | 5/1956 | Sansous ........................ | 362/109 |
| 4,336,574 A * | 6/1982 | Goodman ..................... | 362/101 |
| 4,446,508 A | 5/1984 | Kinzie | |
| 5,307,250 A * | 4/1994 | Pearson ........................ | 362/101 |
| 5,915,832 A | 6/1999 | Baird, Sr. | |
| 6,092,905 A * | 7/2000 | Koehn .......................... | 362/101 |
| 6,193,399 B1 | 2/2001 | Hulse | |
| 6,234,439 B1 | 5/2001 | Townsend et al. | |
| 6,354,711 B1 * | 3/2002 | McCoy ......................... | 362/101 |
| 6,443,589 B1 * | 9/2002 | Lee ............................... | 362/101 |
| 6,619,811 B2 * | 9/2003 | Wang et al. ................... | 362/101 |
| 6,746,132 B2 * | 6/2004 | Liu ............................... | 362/101 |
| 6,793,363 B2 * | 9/2004 | Jensen .......................... | 362/101 |
| 6,863,415 B2 * | 3/2005 | Lu ................................. | 362/101 |
| 6,896,387 B2 * | 5/2005 | Renfro ......................... | 362/602 |
| 7,229,196 B2 * | 6/2007 | Hulse ........................... | 362/341 |
| 7,419,072 B1 * | 9/2008 | Vanella ........................ | 222/113 |
| 7,766,293 B2 * | 8/2010 | Seidl et al. ................. | 248/311.2 |
| 2003/0076672 A1 * | 4/2003 | Head ............................ | 362/101 |
| 2008/0122241 A1 | 5/2008 | Blackmore et al. | |
| 2009/0175049 A1 | 7/2009 | Lota | |

* cited by examiner

*Primary Examiner* — Hargobind S Sawhney
(74) *Attorney, Agent, or Firm* — Rankin Hill & Clark LLP

(57) ABSTRACT

An illuminated cup holder assembly for a vehicle includes at least one side wall and a base wall together defining a cup holder recess. The base wall has a light transmissive portion. An illumination source is secured to an underside of the base wall for illuminating the cup holder recess through the light transmissive portion of the base wall.

22 Claims, 4 Drawing Sheets

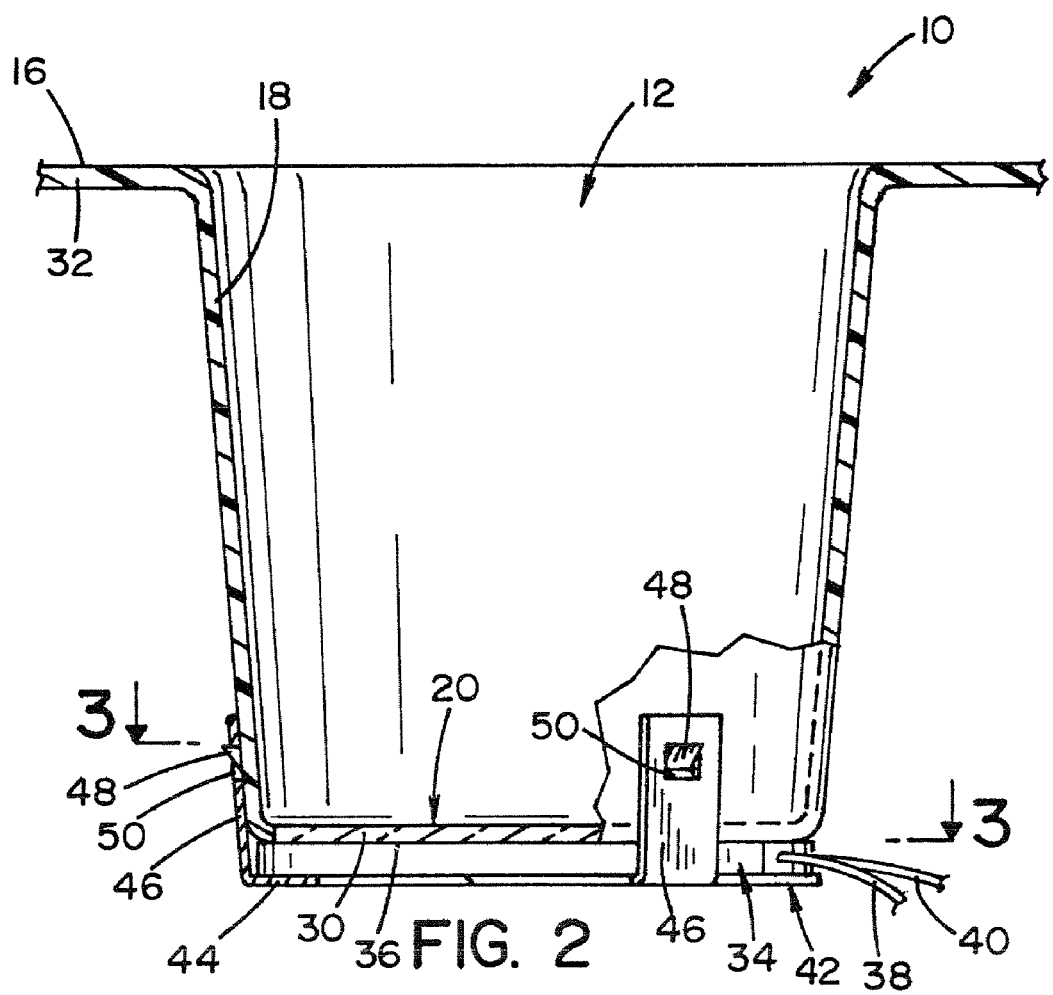
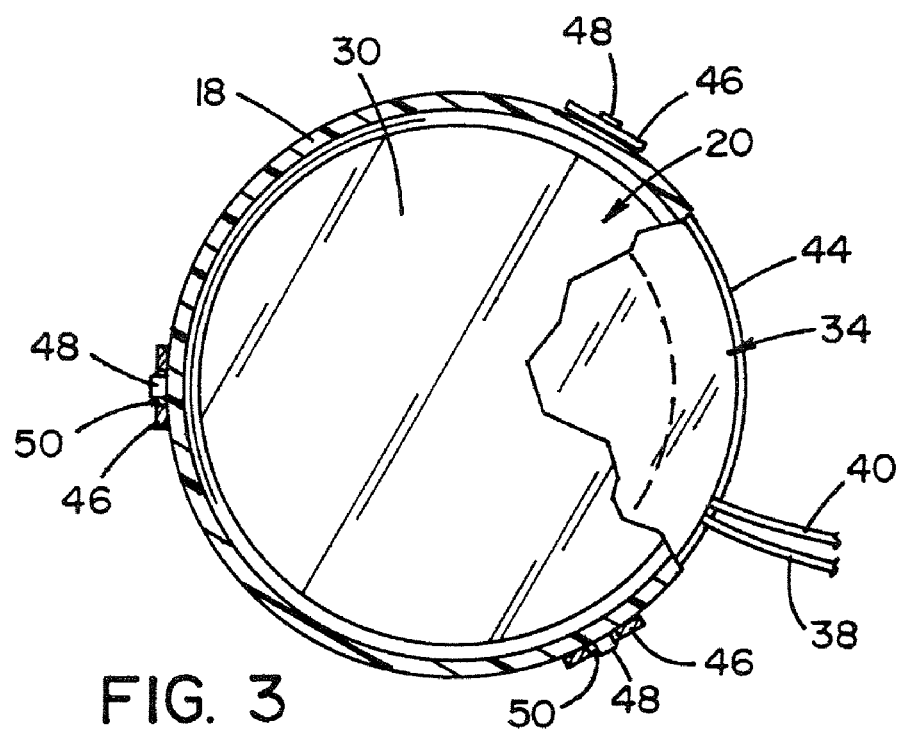

ILLUMINATED CUP HOLDER ASSEMBLY

BACKGROUND

Exemplary embodiments herein relate to illumination inside vehicles, and more particularly, relate to a vehicle illumination assembly for illuminating a recess, such as a cup holder recess.

At present, there are generally three ways that ambient light is provided to illuminate a cup holder in a vehicle. One such arrangement is to provide an overhead ambient light source, such as a LED, that provides a cone of light over the cup holder area. Another arrangement involves using a light source, such as one or more LEDs, disposed on a side of the cup holder. An aperture can be defined in the side wall to allow light from the light source to enter the recess defined by the cup holder. Still another arrangement includes using a light guide or light pipe ring disposed around a top rim of the cup holder to provide a ring of illumination.

One problem with using an overhead ambient light source is that it is often difficult to provide enough light for the cup holders. In addition, the target area can be difficult to hit. Still further, there is usually an excess amount of light hitting other areas around the cup holder. That is, it is difficult to focus the light on only a cup holder area. The problem with placing a light source on a side of the cup holder is that the light source typically provides light in only a limited area and such illumination is not very uniform. Lack of illumination is also associated with the use of a cup holder ring as this tends to illuminate only the ring of the cup holder and does not provide enough light to see into the recess or recesses defined by the cup holder.

SUMMARY

According to one aspect, an illuminated cup holder assembly for a vehicle includes at least one side wall and a base wall together defining a cup holder recess. The base wall has a light transmissive portion. An illumination source is secured to an underside of the base wall for illuminating the cup holder recess through the light transmissive portion of the base wall.

According to another aspect, a vehicle illumination assembly for illuminating a recess includes a base wall having a light transmissive portion and at least one side wall extending upward from the base wall to define the recess together with the base wall. An illumination source is secured adjacent an underside of the base wall for illuminating the recess through the light transmissive portion.

According to still another aspect, a vehicle illumination assembly for illuminating a recess includes a base wall having a light transmissive portion and an illumination source secured adjacent and underside of the base wall for providing illumination through the light transmissive portion.

BRIEF DESCRIPTION OF THE DRAWINGS

FIG. 2 is a section view taken along the line 2-2 of FIG. 1.

FIG. 3 is another section view taken along the line 3-3 of FIG. 2.

DETAILED DESCRIPTION

Figure 1:
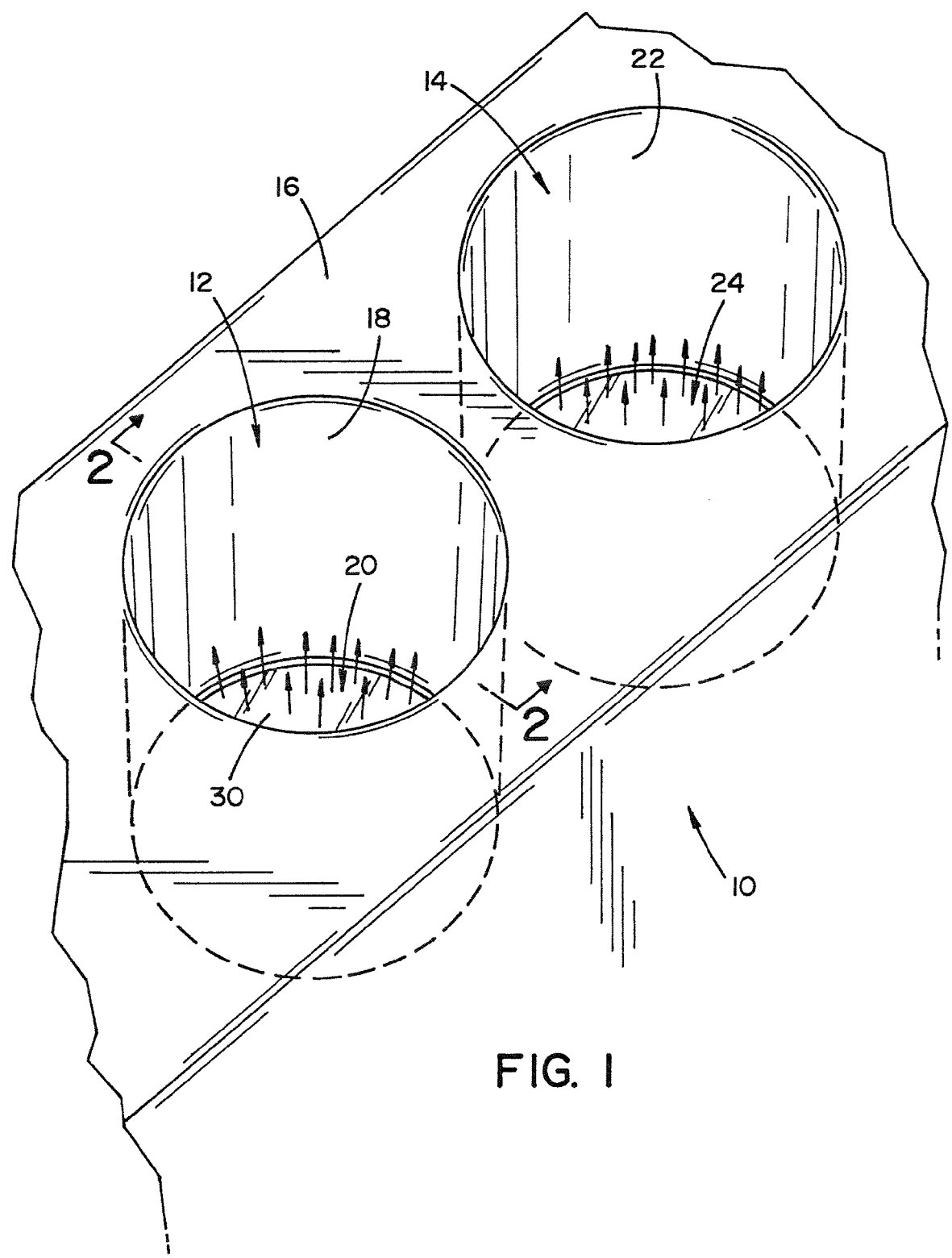
FIG. 1 is a partial perspective view of an illuminated cup holder assembly for a vehicle.

Referring now to the drawings, wherein the showings are for purposes of illustrating one or more exemplary embodiments and not for purposes of limiting same, FIG. 1 illustrates a vehicle illumination assembly 10 for illuminating a recess. In the illustrated embodiment, the vehicle illumination assembly 10 is an illuminated cup holder assembly that illuminates a pair of cup holder recesses 12, 14 in a vehicle. Also in the illustrated embodiment, the recesses 12, 14 are defined in a show surface 16, which can be disposed in a center console area or some other area of the vehicle. While the illustrated cup holder assembly 10 is shown having two cup holder recesses 12, 14, it is to be appreciated that only a single cup holder recess could be used or more than two cup holder recesses could be used. Also, other configurations in addition to those shown with the recesses 12, 14 defined in a show surface 16 are contemplated (e.g., the show surface 16 could have other configurations).

As shown, the cup holder recess 12 is defined by at least one side wall 18 together with a base wall 20. Similarly, the cup holder recess 14 is defined by at least one side wall 22 together with a base wall 24. As will be described in more detail below with particular reference to the cup holder recess 12, the base walls 20, 24 of the recesses 12, 14 each have a light transmissive portion that allows illumination from an illumination source secured to an underside of the base walls 20, 24 to pass therethrough.

Figure 4:
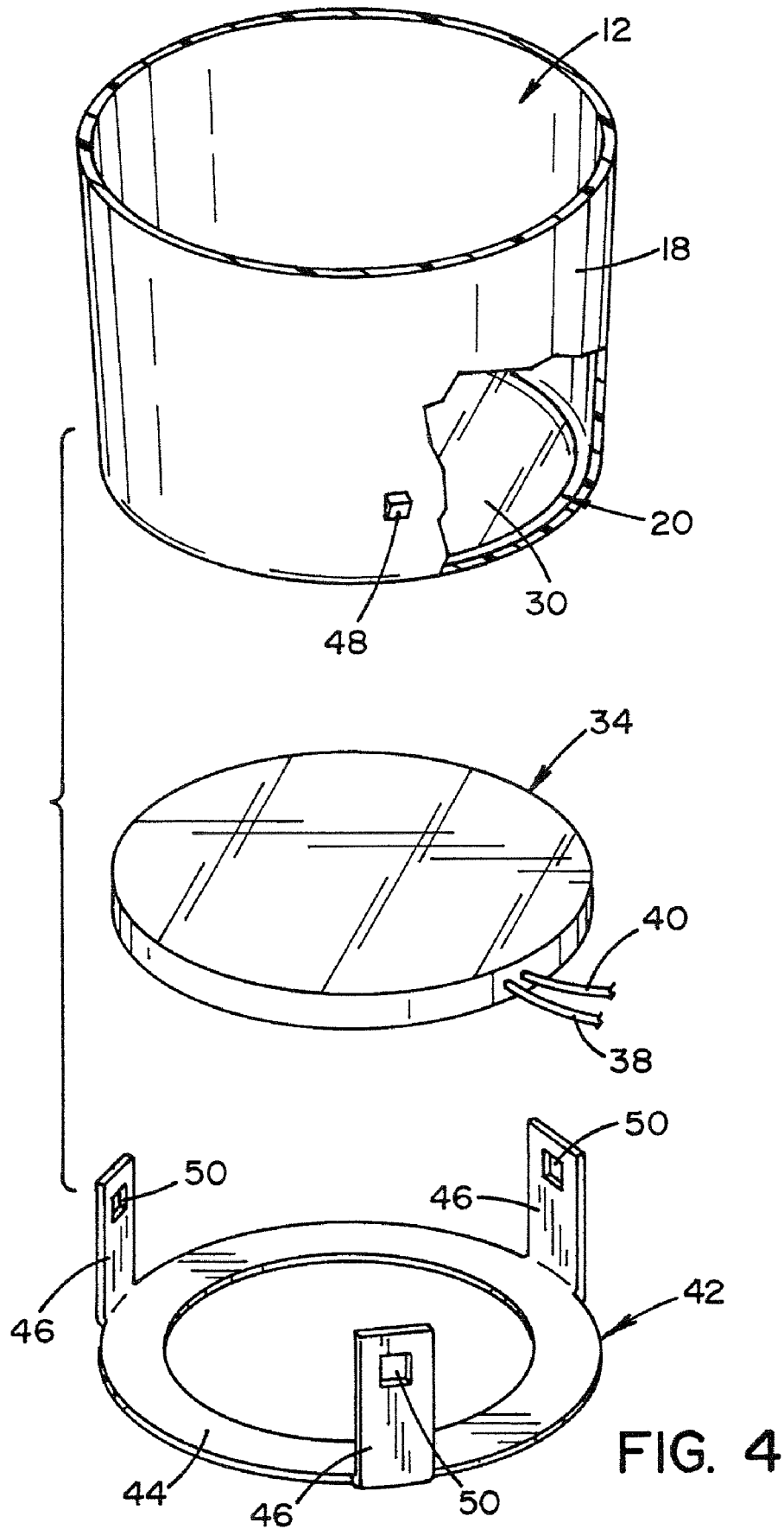
FIG. 4 is an exploded view of one cup holder of the illuminated cup holder assembly.

More particularly, with additional reference to FIGS. 2-4, the recess 12 and its surrounding structure will now be described in further detail. It is to be appreciated that the recess 14 and its surrounding structure can be the same or similarly constructed so no further details are provided on the recess 14, but all details provided in association with the recess 12 can be applicable to the recess 14. As shown, the base wall 20 of the cup holder recess 12 has a light transmissive portion 30. The light transmissive portion 30 can be substantially an entirety of the base wall 20, though this is not required. In addition, the light transmissive portion 30 can be translucent or transparent. In one exemplary embodiment, the base wall 20 is molded in clear plastic such that the light transmissive portion 30 is transparent.

The at least one side wall 18 extends upward from the base wall 20 to define the recess 12 together with the base wall 20. The at least one side wall 18 of the illustrated embodiment has a cylindrical configuration and thus the base wall 20 has a circular configuration, though other configurations and shapes can be used. The cylindrical side wall 18 of the illustrated embodiment can be opaque (i.e., does not transmit illumination) as can any portion of the base wall 20 that does not comprise the light transmissive portion 30. In one embodiment, the cylindrical side wall 18 is molded in conventional black plastic or some other color, though this is not required. As shown, the cylindrical side wall 18 and the base wall 20 can be integrally formed, such as being molded together in two types of plastic (one for the transmissive portion of the base wall 20 and another for the cylindrical side wall 18 and any portion of the base wall 20 that does not comprise the transmissive portion 30). Also shown in the illustrated embodiment, the cylindrical side wall 18 can further be integrally formed with a top wall 32 that has the show surface 16, though this is not required.

An illumination source 34 can be secured adjacent an underside 36 of the base wall 20 for providing illumination through the light transmissive portion 30. As shown, when the at least one side wall 18 has a cylindrical configuration (and the base wall 20 has a circular configuration), the illumination source 34 can likewise have a substantially matching cylindrical configuration, though this is not required. The illumination source 34 can be a LED, a bulb, or some other light source. In one embodiment, the illumination source is an organic LED (or OLED) that provides a soft and/or uniform glow in the bottom of the cup holder recess 12 (i.e., adjacent the base wall 20).

If desired, the illumination source 34 can provide colored illumination. For example, the illumination source 34 could be colored (e.g., a colored LED or bulb) and/or could be used in conjunction with another structure or element that colors the light provided by the illumination source 34. Such a structure or element could be a colored lens or could be some other structure (e.g., a colored plastic disc) with which the illumination source 34 is integrated or inserted into for coloring the illumination. In one embodiment, the illumination source 34 provides colored illumination including different colors of light and the colored illumination is customizable by the customer (i.e., the owner or driver of the vehicle in which the illumination assembly 10 is received). Wire leads 38, 40 can be electrically connected to the illumination source 34 for delivering current to power the illumination source 34.

The illumination source 34 can be secured adjacent the underside 36 of the base wall 20 by a molded-in feature disposed on at least one of the at least one side wall 18, the base wall 20 and/or the illumination source 34 for illuminating the cup holder recess 12 through the light transmissive portion 30 of the base wall 20. In the embodiment illustrated in FIGS. 2-4, the illuminated assembly 10 can further include a supporting structure 42 having a support wall 44 for supporting the illumination source 34 and at least one connecting structure 46 extending upward from the supporting structure 44 for connecting to at least one of the at least one side wall 18 and the base wall 20. In the embodiment illustrated in FIGS. 2-4, the at least one connecting structure 46 is a plurality of tabs extending upward from the support wall 44. The tabs 46 and the cylindrical side wall 18 cooperate to secure the illumination source 34 to the underside 36 of the base wall 20 for illuminating the cup holder recess 12 through the light transmissive portion 30 of the base wall 20.

More specifically, the tabs 46 (i.e., the at least one connecting structure) or the cylindrical side wall 18 (i.e., the at least one side wall) can have an aperture or a barb and the other of the tabs 46 or the cylindrical side wall 18 can have the other of the aperture or the barb. In either configuration, the barb or barbs can be received through corresponding apertures to secure the illumination source 34 to the underside 36 of the base wall 20. In the illustrated embodiment, the cylindrical side wall 18 has a plurality of circumferentially spaced barbs 48 extending radially outwardly therefrom for receipt through apertures 50 defined in the tabs 46. The barbs 48 can have a tapered configuration to facilitate locking installation of the supporting structure 42 onto the cylindrical side wall 18 so that the illumination source 34 can be held by the supporting structure 42 adjacent the underside 36 of the base wall 20. The barbs 48 can be integrally molded into the cylindrical side wall 18.

Figure 5:
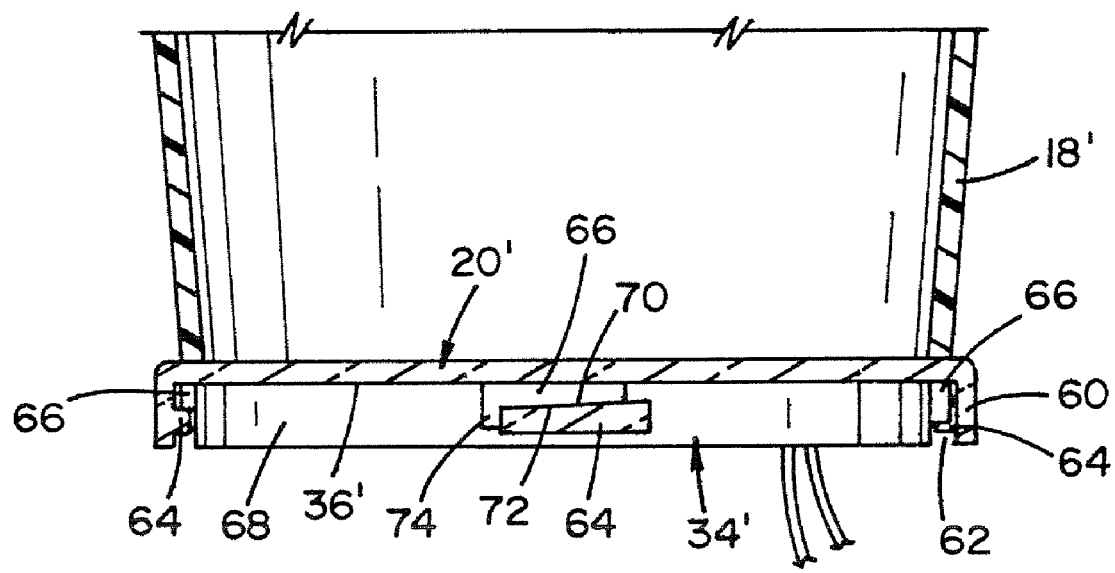
FIG. 5 is a partial sectional view of an illuminated cup holder assembly according to an alternate embodiment.
Figure 6:
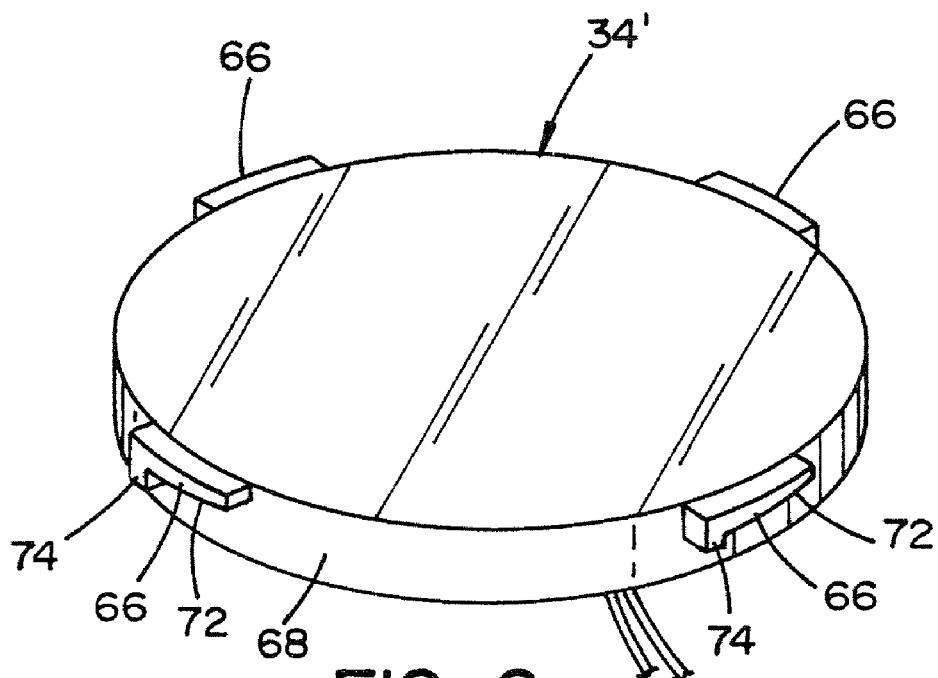
FIG. 6 is a perspective view of an illumination source of the cup holder assembly of FIG. 5.

In an alternate embodiment illustrated in FIGS. 5 and 6, at least one wall 60 depends downward from base wall 20' and defines, together with the base wall 20', an illumination source recess 62 for receiving illumination source 34'. In the embodiment illustrated in FIGS. 5 and 6, similar components are identified with a like reference numeral followed by a prime symbol and new components are identified with a new reference numeral. As shown, the base wall 20' and at least one downward depending wall 60 can be integrally formed with one another, but separately formed from the at least one side wall 18'. In this arrangement, the base wall 20' and at least one downward depending wall 60 can be formed entirely with a light transmissive material (i.e., a material that is transparent or translucent), though this is not required.

As shown, the at least one wall 60 and the illumination source 34' can structurally cooperate to secure the illumination source 34' to underside 36' of the base wall 20'. In the illustrated embodiment, the at least one wall 60 and the illumination source 34' both have cylindrical configurations. Additionally in the illustrated embodiment, the at least one wall 60 (i.e., cylindrical wall) has one or more tabs 64 extending radially inwardly and the illumination source 34' has locking members 66 extending radially outwardly from an outer radial surface 68 of the illumination source 34'. The locking members 66 are rotatable by a rotation of the illumination source 34' into a cooperating locking position with the tabs 64 of the cylindrical wall 60 such that axial withdrawal of the illumination source 34' from the illumination source recess 62 is prevented.

In the illustrated embodiment, the tabs 64 and the locking members 66 have cooperating tapered surfaces 70, 72 for locking the illumination source 34' to the base wall 20' when the illumination source 34' is rotated into the cooperating locking position. The locking members 66 can have extension portions 74 that are downward depending in the illustrated embodiment. The extension portions 74 can serve as stops to prevent further relative rotation between the illumination source 34' and the cylindrical wall 60 in at least one rotatable direction for purposes of indicating when the tabs 64 and the locking members 66 are axially aligned and thus the illumination source 34' is in the cooperating locking position.

It is to be appreciated by those skilled in the art that other cooperating structures can be employed for securing the illumination source 34' to the cylindrical wall 60. For example, a threaded connection could be used between the illumination source 34' and the cylindrical wall 60. Additionally for example, cooperating barbs and apertures can be employed between the illumination source 34' and the at least one wall 60 in an arrangement similar to that described between the barbs 48 and apertures 50 in the embodiment illustrated in FIGS. 2-4.

However the illumination source (e.g., illumination source 34 or 34') is secured to or adjacent the underside of the base wall, it can provide illumination into the recess disposed on an opposite side of the base wall. When the base wall is at the bottom of a cup holder recess, such illumination will illuminate any objects received in the cup holder recess. It is also to be appreciated that the arrangement of the illumination source on the underside of a base wall of a recess can be employed in association with other recesses disposed in a vehicle (e.g., any pocket in the vehicle provided for holding objects). In one embodiment, the illumination source is turned on when the vehicle lights are turned on and can provide a soft glow in the bottom of the recess 12.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An illuminated cup holder assembly for a vehicle, comprising:
   at least one side wall and a base wall together defining a cup holder recess recessed within a show surface in an interior of the vehicle, the at least one side wall and the base wall integrally molded together with one another, the base wall having a light transmissive portion;
   an illumination source secured to an underside of the base wall for illuminating the cup holder recess through the light transmissive portion of the base wall, wherein the illumination source is secured adjacent the underside of the base wall by a molded-in feature on at least one of the at least one side wall, the base wall and the illumination source; and
   a supporting structure having a support wall for supporting the illumination source and at least one connecting structure extending upward from the supporting structure for connecting to at least one of the at least one side wall and the base wall.

2. The illuminated cup holder assembly of claim 1 wherein the light transmissive portion is substantially an entirety of the base wall.

3. The illuminated cup holder assembly of claim 1 wherein the at least one side wall is opaque.

4. The illuminated cup holder assembly of claim 1 wherein the light transmissive portion is transparent.

5. The illuminated cup holder assembly of claim 1 wherein illumination provided by the illumination source is colored.

6. An illuminated cup holder assembly for a vehicle, comprising:
   at least one side wall and a base wall together defining a cup holder recess recessed within a show surface in an interior of the vehicle, the base wall having a light transmissive portion;
   an illumination source secured to an underside of the base wall for illuminating the cup holder recess through the light transmissive portion of the base wall, wherein the illumination source is secured adjacent the underside of the base wall by a molded-in feature on at least one of the at least one side wall, the base wall and the illumination source; and
   a supporting structure having a support wall for supporting the illumination source and at least one connecting structure extending upward from the supporting structure for connecting to at least one of the at least one side wall and the base wall.

7. The illuminated cup holder assembly of claim 6 wherein each of the at least one connecting structure is a tab extending upward from the support structure, the tab and the at least one side wall cooperating to secure the illumination source to the underside of the base wall.

8. The illuminated cup holder assembly of claim 7 wherein one of the at least one connecting structure or the at least one side wall has an aperture or a barb and the other of the at least one connecting structure or the at least one side wall has the other of the aperture or the barb, the barb received through the aperture to secure the illumination source to the underside of the base wall, the molded-in feature being at least one of the aperture or the barb.

9. The illuminated cup holder assembly of claim 6 wherein the illumination source is a LED held by the supporting structure adjacent the underside of the base wall.

10. The illuminated cup holder assembly of claim 9 wherein the illumination source is a OLED.

11. The illuminated cup holder assembly of claim 6 wherein the at least one side wall is cylindrical having a plurality of circumferentially spaced barbs extending radially outwardly therefrom for receipt through apertures defined in the at least one connecting structure.

12. The illuminated cup holder assembly of claim 11 further including:
   at least one wall depending downward from the base wall and defining, together with the base wall, an illumination source recess for receiving the illumination source.

13. The illuminated cup holder assembly of claim 12 wherein the at least one wall and the illumination source structurally cooperate to secure the illumination source to the underside of the base wall.

14. The illuminated cup holder assembly of claim 13 wherein the at least one wall and the illumination source have cylindrical configurations.

15. The illuminated cup holder assembly of claim 12 wherein the at least one wall is integrally formed with the base wall.

16. The illuminated cup holder assembly of claim 6 wherein the at least one side wall and the base wall are integrally formed.

17. A vehicle illumination assembly for illuminating a recess, comprising:
   a base wall having a light transmissive portion;
   at least one side wall extending upward from the base wall to define the recess together with the base wall; and
   an illumination source secured adjacent an underside of the base wall for illuminating the recess through the light transmissive portion, wherein the at least one wall has tabs extending radially inwardly and the illumination source has locking members extending radially outwardly from an outer radial surface thereof, the locking members rotatable into a cooperating locking position with the tabs of the at least one wall.

18. The illuminated cup holder assembly of claim 9 wherein the tabs and the locking members having cooperating tapered surfaces for locking the illumination source to the base wall when the illumination source is rotated into the cooperating locking position.

19. The underside vehicle illumination assembly of claim 18 wherein the illumination source is a OLED.

20. The vehicle illumination assembly of claim 18 wherein the base wall and the at least one side wall are integrally formed as a unitary structure.

21. A vehicle illumination assembly for illuminating a recess, comprising:
   at least one side wall;
   a base wall connected to the at least one side wall and having a light transmissive portion;
   an illumination source secured adjacent an underside of the base wall for providing illumination through the light transmissive portion;
   a supporting structure having a support wall for supporting the illumination source and at least one connecting structure extending upward from the supporting structure for connecting to at least one of the at least one side wall and the base wall, wherein each of the at least one connecting structure is a tab extending upward from the support structure, the tab and the at least one side wall cooperating to secure the illumination source to the underside of the base wall, wherein one of the at least one connecting structure or the at least one side wall has an aperture or a barb and the other of the at least one connecting structure or the at least one side wall has the other of the aperture or the barb, the barb received through the aperture to secure the illumination source to the underside of the base wall.

22. The vehicle illumination assembly of claim 21 wherein the base wall and the at least one side wall are integrally formed as a unitary structure.

* * * * *